(12) United States Patent
Ziegler et al.

(10) Patent No.: US 6,358,459 B1
(45) Date of Patent: Mar. 19, 2002

(54) METHOD FOR THE PRODUCTION OF MOLDED BODIES FROM POLYMER FOAM PARTICLES

(75) Inventors: Maik Ziegler, Weissach; Adam Geissler, Karlsdorf-Neuthard; Axel Kauffmann, Weil der Stadt; Lars Ziegler, Leonberg; Knut Hofmann, Bretten; Peter Elsner, Pfinztal, all of (DE)

(73) Assignee: Fraunhofer-Gesellschaft zur Förderung der angewandten Forschunge. V., München (DE)

( * ) Notice: Subject to any disclaimer, the term of this patent is extended or adjusted under 35 U.S.C. 154(b) by 0 days.

(21) Appl. No.: 09/461,354

(22) Filed: Dec. 15, 1999

(30) Foreign Application Priority Data

Dec. 29, 1998 (DE) .......................... 198 60 611

(51) Int. Cl.⁷ .............................................. B29C 67/20
(52) U.S. Cl. ........................ 264/413; 264/102; 264/126; 264/321; 264/489; 264/571
(58) Field of Search ................................ 264/413, 489, 264/126, 571, 102, 321

(56) References Cited

U.S. PATENT DOCUMENTS

| | | | | |
|---|---|---|---|---|
| 4,347,213 A | * | 8/1982 | Rogers, Jr. ................... | 264/222 |
| 4,615,856 A | * | 10/1986 | Silverman .................... | 264/102 |
| 4,783,288 A | * | 11/1988 | Gohring et al. ............. | 264/126 |
| 4,828,325 A | * | 5/1989 | Brooks ........................ | 264/46.6 |
| 5,128,073 A | * | 7/1992 | Allen et al. ................. | 264/45.4 |
| 5,316,149 A | * | 5/1994 | Tate ............................ | 206/584 |
| 5,449,887 A | * | 9/1995 | Holcombe et al. .......... | 264/489 |
| 5,609,891 A | * | 3/1997 | Delaunay et al. ........... | 264/489 |

FOREIGN PATENT DOCUMENTS

| | | |
|---|---|---|
| DE | 34 37 786 | 4/1986 |
| DE | 196 48 525 | 5/1998 |
| EP | 0 316 850 | 5/1989 |
| EP | 06 72 708 | 9/1995 |
| WO | WO 96 02 375 | 2/1996 |

* cited by examiner

*Primary Examiner*—Allan R. Kuhns
(74) *Attorney, Agent, or Firm*—Paul Vincent

(57) ABSTRACT

A method for the production of molded bodies comprising foam particles is proposed in which the foam particles are shaped and welded together using microwave energy. The foam particles are accommodated in a foil-like bag and the bag is manually shaped or shaped through the use of a shaped mold with simultaneous change of the shape of the foam particles, and evacuated into a dense package. Microwave energy is subsequently used to melt together at least the surfaces of the foam particles. The method in accordance with the invention is particularly well suited as an economical manufacturing technique for packaging, in particular specialized packaging for models, small production runs, prototypes and the like.

17 Claims, 2 Drawing Sheets

METHOD FOR THE PRODUCTION OF MOLDED BODIES FROM POLYMER FOAM PARTICLES

This application claims Paris Convention priority of DE 198 60 611.7 filed Dec. 29, 1998 the complete disclosure of which is hereby incorporated by reference.

BACKGROUND OF THE INVENTION

The invention concerns a method for the manufacture of molded bodies from polymer foam particles, wherein the foam particles are shaped and welded together using microwave energy.

Foam particles are conventionally processed in a closed mold using superheated steam and are caused to melt at least at their surfaces to thereby effect a welded connection between the particles. The molding pressure itself shapes the particles into the desired molded body. When the molded body cools, the steam condenses in the cavities so that a drying process must follow the molding process. It is normally not possible to remove all of the moisture.

In another conventional method (WO 90/08642 A1), foamed or pre-foamed polymer particles are treated with a microwave absorbing agent and introduced into a mold. After closing the mold, the foam particles are melted using microwave energy, optionally with the release of an agent causing additional expansion. The melting of the particles is thereby achieved by boiling of the generally liquid microwave absorbing agent though irradiation with radio frequency electromagnetic radiation having frequencies in the vicinity of the resonant frequency of the molecules within the agent. The boiled-off gas distributes itself evenly within the mold and within the intermediate particle cavities. The boiling temperature of the agent can be increased by increasing the pressure in the mold. Heat transfer to the surface of the particles causes melting thereof. They can optionally expand further with the release of an expanding agent. Towards this end, the molds must be pressure tight. A variation of this method provides for packaging a molded body produced in this fashion using a foil-type liner introduced into the mold.

The above mentioned procedures have the particular disadvantage that production of the molds is expensive. The gaseous heat carriers require that the mold be pressure tight. When microwave radiation is used, the mold must be made from a substantially microwave permeable material. For economic reasons, the conventional procedures are only suitable for mass production of molded bodies. Small production runs or individual custom production, e.g. for models, prototypes or the like are very expensive to produce. DE 42 36 717 C1 discloses a method for the production of a molded body using granulated beads comprising a biologically degradable material such as starch, wherein the granulated beads are introduced into a mold and treated with dry steam or hot air. At least a portion of the surface of the granulated pearls begins to flow and the pearls are thereby glued together to form a permanent molded body. Molded bodies produced in this fashion can, in particular, be used as padding bodies in packaging surrounding fragile articles.

DE 196 48 525 A1 describes the manufacture of inner cover components for motor vehicles such as sun visors, rear shelves, side portions and inside roof linings or the like, wherein a prepared hollow body, e.g. the outer skin of a visor, is filled with shrunken foam particles and these are expanded and welded together using a microwave absorbing agent. In order to support the hollow body walls against the expansion pressure of the foam particles, the hollow body is initially introduced into and completely surrounded by a mold having the same shape, prior to melting of the foam particles.

EP 0 316 850 A1 describes a method for the production of padding bodies for packaging applications, wherein a foil type bag is filled with expandable polymer particles and the bag, with the particles, is introduced at the padding location into a package filled with the product to be packaged. The particles are then expanded and the padded body shapes about and fills the intermediate spaces between the package and the product to thereby protect the product from mechanical loads.

Padded body pallets or cushions are known in the art for medical applications and comprise a gas-tight, flexible sleeve with loosely disposed polymer foam particles therein. During ambulance transport, in particular for patients who may have spinal column injuries, the patient is placed on such a pallet and the foam particles adapt to the individual body contours of the injured individual. The sleeve is then evacuated and the body support is thereby stabilized in a manner suitable to the patient. When atmospheric pressure is once more applied to the flexible sleeve, the body support can be reused for transport of another patient.

SUMMARY OF THE INVENTION

It is the underlying purpose of the invention to propose a method for economical production of stable molded bodies made from particle foam.

This purpose is achieved in accordance with the invention with a method of the above mentioned kind in that the foam particles are accommodated in a gas tight, foil-like bag, and the bag with the foam particles is molded into a dense particle package having the molded shape by placement on or insertion in a shaping mold and through evacuation of the bag on or in the shaping mold. The tightly packed foam particles are then irradiated with microwave energy while maintaining the partial pressure on the bag so that at least their surfaces melt together.

In accordance with the invention, the foam particles are loosely inserted into a gas tight foil-like bag and shaped though placement of or placement in a shaping mold whose sole purpose is to define the shape of the desired molded body. The shaping mold can consequently be made from any kind of inexpensive material. The shaping and stabilization is effected, in accordance with the invention, through evacuation of the foil-like bag, wherein the foam particles loosely disposed in the bag also deform due to the external pressure and due to the evacuation of the air out of their open pore hollow cavities. The originally substantially spherical particles deform into the spaces between the particles originally filled with gas or air and wedge together mechanically. The bag adapts to the defined shape and tightly surrounds the foam particles proximate the surface. The shape of a molded body produced in this fashion is maintained as long as the partial pressure within the bag is maintained. In this state, at least the surfaces of the foam particles are melted together using microwave energy by disposing the evacuated bag with the foam particles in a microwave field to weld the foam particles together in a conventional manner and to produce a molded body having a permanent, stable shape.

The shaping is preferentially effected in such a fashion that the bag with the foam particles is inserted into a single or multiple component mold and shaped through evacuation of the bag and simultaneous compression of the molded cavity, wherein the mold can, in particular, be made from inexpensive materials, since, in accordance with the invention, it must not fulfill any particular requirements with regard to pressure stability, temperature stability or the like.

The bag having the foam particles can be manually shaped only or, during evacuation, be manually reshaped on or in a shaping mold.

Another embodiment is distinguished in that that two or more bags having foam particles are disposed to completely or partially surround a mold and are shaped through evacuation of the bag with the formation of a molded body having a plurality of components. In this manner, molded bodies can be obtained having a plurality of components, in particular a plurality of shells, which can be assembled into a substantially closed shell. Padded bodies can e.g. thereby be effected which can substantially enclose a product to be packaged to protect it from outside forces.

The foam particles can comprise e.g. polyolefines such as polyethylene (PE), polypropylene (PP) or the like or can be made from polystyrene (PS) co-polymers or polymer blends.

With the method in accordance with the invention, polymer foam particles can be used in the form of expanded pearls which, in preferred embodiments, comprise expanded polyethylene (EPE), expanded polypropylene (EPP), expanded polystyrene (EPS) or co-polymers thereof. Alternatively, pre-expanded particles can be used having an expanding agent which decomposes under irradiation with microwave energy so that the particles expand to their final size. Towards this end, an expanding agent should be used whose decomposition or boiling temperature exceeds the melting temperature of the polymer used so that, when heating up to this temperature, one guarantees that not only does the expanding agent decompose rather the polymer also has a sufficient amount of heat to melt.

In order to guarantee reaching at least that temperature needed to melt the surfaces of the foam particles during irradiation of microwave energy, foam particles can be used which have a microwave absorbing polymer or foam particles made from polymers which are substantially permeable to microwaves but which are treated with a microwave absorbing agent. Microwave absorbing agents can be used which are preferentially liquids and, in particular, polar liquids such as water, alcohol or the like or even electrically conducting liquids such as salt solutions with which the foam particles are wet either prior to filling into the foil-like bag or which are added to the bag after filling with the polymer foam particles. The boiling-off of the microwave absorbing liquid leads to a homogeneous distribution of the agent and thereby to a homogeneous heat transfer to the polymer foam particles, wherein the boiling temperature and thereby the temperature required to at least melt the surfaced of the foam particles can be adjusted by the partial pressure produced through evacuation of the bag. The vapors produced are suctioned off through the applied vacuum after having given off their heat.

Alternatively, microwave absorbing media comprising solids such as metallic powder (e.g. aluminum, iron, zinc etc.), metallic oxides or carbon black can be utilized which are mixed with the foam particles or introduced together with the wetting agent. When using foam particles which can still be expanded, a microwave absorbing expanding agent can alternatively or additionally be used.

A preferred embodiment provides that the partial pressure in the bag after evacuation and shaping is maintained during microwave irradiation by sealing the bag e.g. in a gas tight manner or by pumping, e.g. with a vacuum pump connected to the bag during microwave irradiation. The bag can also be evacuated using a regulated vacuum pump so that the partial pressure in the bag can be regulated during microwave irradiation to regulate the desired boiling temperature of liquid microwave absorbing agents via the partial pressure.

The bag preferentially made from plastic can, if desired, be removed from the finished molded body or, e.g. can surround the melted-together foam particles as a decorative foil and remain on the finished molded body. In the first case, the bag is advantageously made from a polymer having a higher melting temperature than the melting temperature of the foam particles. In the latter case, a polymer is preferentially used having a similar or even a lower melting temperature than that of the foam particles so that an intimate connection is established not only among the foam particles themselves but also between them and the bag effecting a decorative packaging foil or the like.

The method in accordance with the invention is particularly suited for straightforward, rapid and economical manufacture of models, small production runs, prototypes and the like. In addition, the method is suitable for the individual production of shock absorbing molded bodies such as padding bodies for packaging, e.g. individual packaging for devices produced in low numbers, filling bodies for hollow cavities or for mold cores, for medical cushions or for absorbing inlays in crash helmets.

The invention is more closely described below with reference to embodiments and to the drawing.

DESCRIPTION OF THE PREFERRED EMBODIMENT

Figure 1:
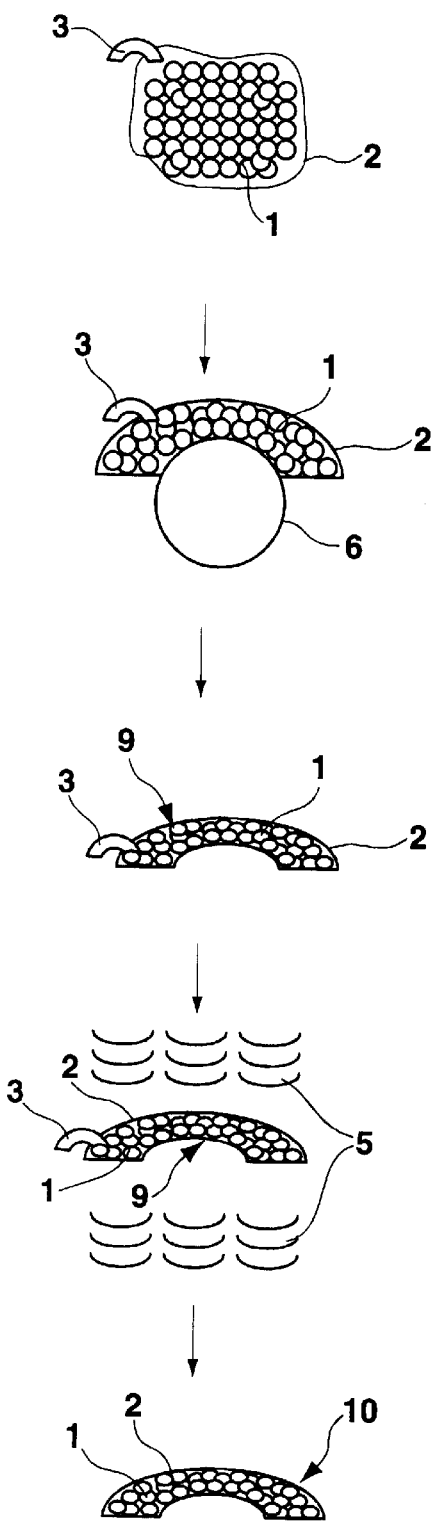
FIG. 1 shows a schematic process dependence in a first embodiment for production of a shock absorbing cushion body.

FIG. 1 shows an embodiment of the method in accordance with the invention for the production of a shock absorbing padded body 10, e.g. for crash helmets. Towards this end, polymer foam particles 1 are treated with a microwave absorbing agent and filled into a bag 2 made from a gas-tight foil. In the embodiment shown, the bag has a connector 3 for a vacuum pump.

The foam particles 1 are adapted to a molding shape 6 by placing the bag 2 onto this molding shape 6, simulating the human skull, with additional optional manual shaping. The bag 2 is simultaneously evacuated by a vacuum pump (not shown) via the connector 3 so that the foam particles 1 are compressed in response to the excess external pressure acting, in particular, on the upper side of the evacuated bag 2. The air is simultaneously suctioned out of the open pored hollow cavities of the foam. The foam particles 1 thereby acquire completely irregular, differing shapes so that a very dense, firmly pressed package is produced with the foam particles 1 engaging each other with substantially larger contact surfaces than in the initial state. A sufficiently stable preformed molded body 9 is thereby obtained corresponding to the shaping mold 6. This preformed body 9 is subsequently irradiated with microwave energy 5 while still being placed on the shaping mold 6 or after removal therefrom so that the microwave absorbing agent is heated. Heat transfer to the foam particles 1 results in the melting thereof, at least at their surfaces, so that, after cooling, they are connected to each other in an integrated material manner. The final molded body 10 thereby obtained can be utilized as a shock absorbing element in a crash helmet casing. The economical method in accordance with the invention also facilitates individual custom production by directly shaping the bag 2, having the foam particles 1, on the head of the user.

Figure 2:
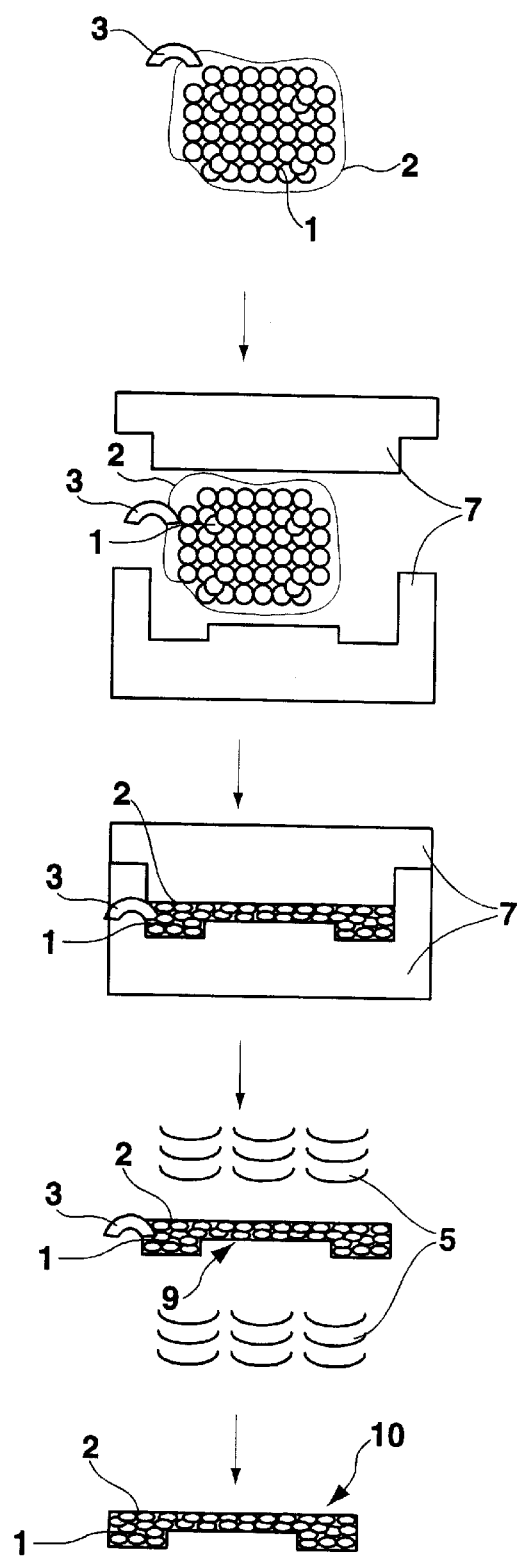
FIG. 2 shows a schematic processing dependence in another embodiment for production of a packaging body.

In the variation of the method in accordance with the invention shown in FIG. 2, padded bodies are produced e.g. for packaged devices produced in low quantities. These embodiments differ from FIG. 1 in that the foam particles 1 are loosely filled into the bag 2 and, after application of a vacuum, are shaped using a two component mold 7 under simultaneous reduction of the size of the molding cavity, wherein the mold 7 has the sole purpose of determining the molded shape and in consequence thereof, can consist essentially of an arbitrary, inexpensive and easily worked material. The bag 2 can also be configured as a decorative foil surrounding the manufactured foam-molded body 10. The preformed molded body 9 is removed from the mold 7 and introduced into a MW field 5 to produce the final molded body 10 through melting of the foam particles 1.

Figure 3:
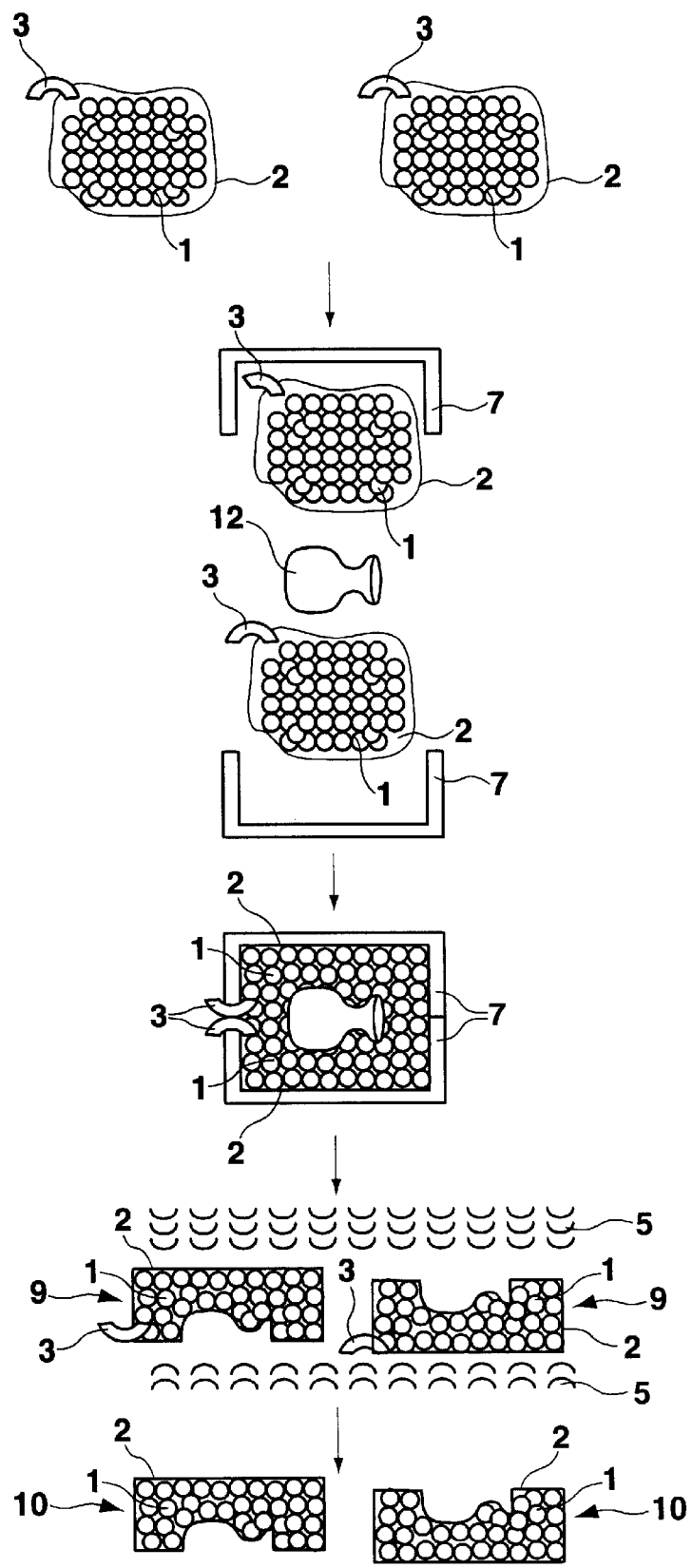
FIG. 3 shows a schematic processing dependence in an additional embodiment for production of an individual packaging for fragile items.

In the embodiment in accordance with FIG. 3, padded bodies are produced for the packaging of fragile articles 12 by filling two bags 2 filled with foam particles 1, whose shaping is effected through placement onto the fragile item 12 and insertion into a packaging container or into a corresponding two part mold 7.

The foam particles 1 and the bag 2 can be made from the same or from differing polymers, wherein the former embodiment is preferred due to its material purity and the associated possibility of easy recycling. The mold 7 can likewise be made from the same polymer.

We claim:

1. A method for the manufacture of molded bodies from polymer foam particles by shaping and welding together the foam particles using microwave energy, the method comprising the steps of:
   a) placing foam particles in a gas-tight, foil-like bag;
   b) disposing said bag with said foam particles on or in a shaping mold;
   c) evacuating said bag on or in said mold to shape said bag with said foam particles into a dense particle package to form a molded body; and
   d) irradiating said dense partial package with microwave energy while maintaining partial pressure in said bag to melt together surfaces of the foam particles and to melt said bag together with said foam particles, wherein said bag is made from a plastic polymer having a melting temperature in a melting temperature range of said foam particles.

2. The method of claim 1, wherein at least two bags having foam particles are disposed, in step b), to partially or completely surround said shaping mold and are formed, in step c) into a molded body having a plurality of components.

3. The method of claim 1, wherein said foil-like bag having said foam particles is disposed, in step b), into a shaping mold having at least two components, and step c) comprises the step of decreasing a molding volume of said shaping mold.

4. The method of claim 1, further comprising the step of manually shaping said foil-like bag having said foam particles.

5. The method of claim 1, wherein said foam particles are made from one of a polyolefine, polyethylene, polystyrene, and co-polymers thereof.

6. The method of claim 5, wherein said foam particles comprise one of expanded polymers, EPE, EPP, EPS and copolymers thereof.

7. The method of claim 1, wherein said foam particles comprise a microwave absorbing polymer.

8. The method of claim 1, wherein said foam particles comprise a substantially microwave permeable polymer treated with a microwave absorbing agent.

9. The method of claim 8, wherein said microwave absorbing agent is one of a liquid, water, and alcohol.

10. The method of claim 8, wherein said microwave absorbing agent is one of a solid, a metallic powder, and carbon black.

11. The method of claim 8, wherein said microwave absorbing agent is an expanding agent added to said polymer for manufacture of said foam particles.

12. The method of claim 1, wherein said partial pressure in said bag is controlled during step d).

13. The method of claim 12, wherein said partial pressure is controlled using a vacuum pump.

14. The method of claim 1, wherein said bag comprises a microwave permeable polymer.

15. The method of claim 1, wherein a same polymer is utilized for said bag and for said foam particles.

16. The method of claim 1, wherein said bag comprises a decorative foil.

17. The method of claim 1, wherein one of models, small production runs, prototypes, padded bodies for packaging, filling bodies for cavities, and mold cores are produced.

* * * * *